(12) United States Patent
Balch

(10) Patent No.: US 11,584,295 B2
(45) Date of Patent: Feb. 21, 2023

(54) DYNAMIC LIGHTING AND SENSOR ADJUSTMENT FOR OCCUPANT MONITORING

(71) Applicant: TOYOTA RESEARCH INSTITUTE, INC., Los Altos, CA (US)

(72) Inventor: Thomas Balch, Somerville, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 16/869,293

(22) Filed: May 7, 2020

(65) Prior Publication Data

US 2021/0347298 A1 Nov. 11, 2021

(51) Int. Cl.
| | |
|---|---|
| *B60Q 3/80* | (2017.01) |
| *F21V 23/04* | (2006.01) |
| *H05B 47/13* | (2020.01) |
| *H05B 47/125* | (2020.01) |
| *B60Q 3/74* | (2017.01) |
| *B60Q 3/62* | (2017.01) |
| *B60Q 9/00* | (2006.01) |
| *B60Q 3/18* | (2017.01) |
| *B60Q 3/72* | (2017.01) |

(52) U.S. Cl.
CPC ............... *B60Q 3/80* (2017.02); *B60Q 3/18* (2017.02); *B60Q 3/62* (2017.02); *B60Q 3/72* (2017.02); *B60Q 3/74* (2017.02); *B60Q 9/005* (2013.01); *F21V 23/0464* (2013.01); *H05B 47/125* (2020.01); *H05B 47/13* (2020.01); *B60Q 2300/31* (2013.01)

(58) Field of Classification Search
CPC ........ B60Q 3/80; H05B 47/13; H05B 47/125; F21V 23/0464; H04N 5/22521; H04N 5/2258; G02B 2027/013; G02B 2027/0138
See application file for complete search history.

(56) References Cited

U.S. PATENT DOCUMENTS

| | | | |
|---|---|---|---|
| 7,199,767 B2 | 4/2007 | Spero | |
| 9,409,464 B2 | 8/2016 | Tomkins et al. | |
| 9,718,405 B1 * | 8/2017 | Englander | ............... B60R 1/00 |
| 10,173,529 B2 | 1/2019 | Korthauer | |
| 10,499,180 B1 * | 12/2019 | Harper | ................... H04R 5/02 |

(Continued)

FOREIGN PATENT DOCUMENTS

| | | | | |
|---|---|---|---|---|
| CN | 112543876 A | * | 3/2021 | ......... B60W 60/001 |
| DE | 102006041856 A1 | | 3/2007 | |

(Continued)

*Primary Examiner* — Abdullah A Riyami
*Assistant Examiner* — Syed M Kaiser
(74) *Attorney, Agent, or Firm* — Seyfarth Shaw LLP

(57) ABSTRACT

Systems and methods to proactively adapt image sensor settings of an occupant monitoring system to accommodate ambient lighting changes are provided. The system may track current ambient light, track the driver, and predict upcoming changing lighting conditions. Sensors are used to predict when the ambient light will change and preemptively adjust to prevent dark or washout images. The sensor adjustment may be timed so that the adjustment is made just in time or concurrently with the change in ambient light conditions. The system may predict when the light on the occupant's face will change and proactively readjust the settings of the sensor to accommodate the changed lighting conditions.

20 Claims, 4 Drawing Sheets

(56) References Cited

U.S. PATENT DOCUMENTS

| | | | | |
|---|---|---|---|---|
| 2006/0125919 | A1* | 6/2006 | Camilleri | H04N 7/183 |
| | | | | 348/148 |
| 2012/0239213 | A1* | 9/2012 | Nagata | G06Q 50/06 |
| | | | | 700/291 |
| 2015/0345939 | A1* | 12/2015 | Salter | B60Q 1/22 |
| | | | | 356/138 |
| 2016/0152178 | A1* | 6/2016 | Peterson | B60Q 3/80 |
| | | | | 315/77 |
| 2019/0061468 | A1* | 2/2019 | Reed | B60H 1/00778 |
| 2019/0208111 | A1* | 7/2019 | Wendel | H04N 5/2258 |
| 2020/0231111 | A1* | 7/2020 | Ghannam | B60R 21/01552 |
| 2020/0271450 | A1* | 8/2020 | Gorur Sheshagiri | |
| | | | | G02B 27/0101 |

FOREIGN PATENT DOCUMENTS

| | | | |
|---|---|---|---|
| DE | 102012017276 A1 | 3/2014 | |
| WO | WO-2018131035 A1 * | 7/2018 | G06T 15/20 |

* cited by examiner

DYNAMIC LIGHTING AND SENSOR ADJUSTMENT FOR OCCUPANT MONITORING

FIELD OF TECHNOLOGY

The present disclosure relates to a system and method for monitoring the occupant of a vehicle, more particularly to an occupant monitoring system to proactively adjust monitoring sensors as ambient light changes.

BACKGROUND

Autonomous and semi-autonomous vehicles rely on occupant monitoring systems and applications to supervise or otherwise track the activities and movements of a vehicle occupant. The ability to determine and track the position, pose, posture, attentiveness, and other characteristics of an occupant assist the safe and efficient operation of the vehicle. For example, an occupant monitoring system may require identifying a driver in the driver seat prior to operating the vehicle. The system may further monitor the occupant in the driver seat to ensure the driver is awake, alert and in a proper pose to take over operation of the vehicle should manual intervention be needed.

Traditional driver monitoring systems feature one or more sensors and/or cameras that may identify and track the driver's eyes, head position, pose and the like. Those sensors and cameras are highly affected by lighting conditions in and around the vehicle. Infrared sensors used to capture the driver's image, for example, may be highly sensitive to changing lighting conditions in the vehicle cabin due to ambient changes in light outside of the vehicle. Fast ambient lighting changes may cause the sensed image to be too dark or too washed out. For example, when the car makes a turn and the sun is on the driver's face, the image provided by the sensor may be washed out for a second or two. This may temporarily disable the driver monitoring system, causing it not function properly. Traditional driver monitoring systems, and adjustments to the image sensing components are reactive to changes in ambient lighting and lag behind the real-time changes to the environment.

SUMMARY

Aspects of the present disclosure provide for systems and methods to proactively adapt image sensor settings of an occupant monitoring system to accommodate ambient lighting changes. The system may track current ambient light, track the driver, and predict upcoming changing lighting conditions. Sensors are used to predict when the ambient light will change. and preemptively adjust to prevent dark or washout images. The sensor adjustment may be timed so that the adjustment is made just in time or concurrently with the change in ambient light conditions. The system may predict when the light on the occupant's face will change and proactively readjust the settings of the sensor to accommodate the changed lighting conditions.

According to one aspect an imaging system is disclosed. The imaging system may include one or more environmental sensors, a camera including one or more image sensors, and a predictive lighting module in communication with the one or more environmental sensors and the camera. The predictive lighting module may be configured to receive environmental data from the one or more environmental sensors and adjust the one or more image sensors according to a first in-cabin lighting level. A prospective environmental change may be determined based on the environmental data. A second in-cabin lighting may be predicted level based upon the prospective environmental change and the one or more image sensors may be adjusted according to the second in-cabin lighting level substantially concurrently with the prospective environmental change.

According to another aspect of the present disclosure, a method of monitoring a vehicle occupant is provided. According to the method, environmental data may be received from the one or more environmental sensors and one or more image sensors may be adjusted according to a first in-cabin lighting level. A prospective environmental change may be determined based on the environmental data and a second in-cabin lighting level may be predicted based upon the prospective environmental change. The one or more image sensors may be adjusted according to the second in-cabin lighting level substantially concurrently with the prospective environmental change.

According to another aspect of the present disclosure, an occupant monitoring system for a vehicle may include an occupant facing camera comprising one or more image sensors, a communications module configured to receive navigational data, one or more environmental sensors configured to receive environmental data and a predictive lighting module in communication with the one or more environmental sensors and the occupant-facing camera. The predictive lighting module may be configured to receive environmental data from the one or more environmental sensors and navigation information from the communications module. One or more image sensors may be adjusted according to a first in-cabin lighting level. A prospective environmental change may be determined based on the environmental data and the navigational data. A second in-cabin lighting level may be predicted based upon the prospective environmental change. The one or more image sensors may be adjusted according to the second in-cabin lighting level substantially concurrently with the prospective environmental change.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

Figure 1:
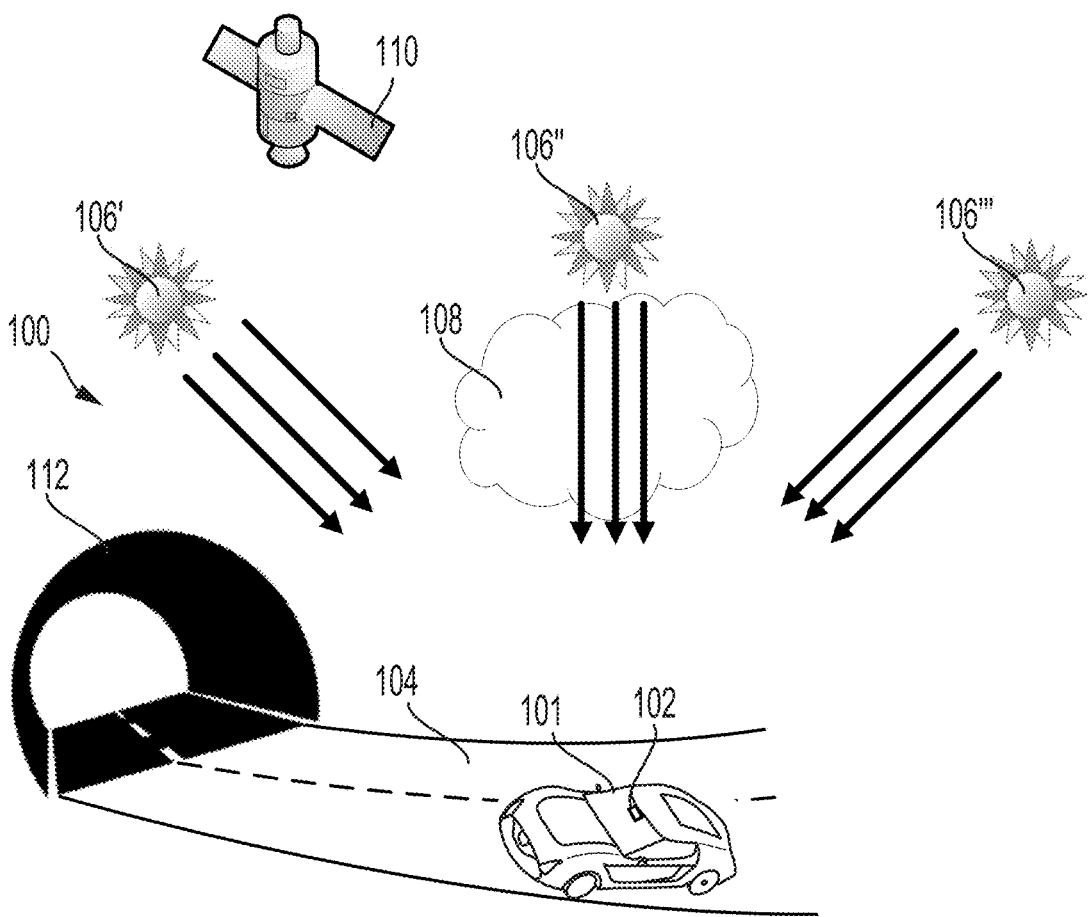
FIG. 1 is a diagram of a dynamic lighting environment and vehicle according to one aspect of the present disclosure.

Aspects of the present disclosure provide an occupant monitoring system with proactive lighting adjustment to accommodate pending changes to ambient lighting. FIG. 1 depicts a dynamic lighting environment 100 and vehicle 101 according to one aspect of the present disclosure. A vehicle 101 equipped with an occupant monitoring system 102 may experience a number of environmental light changes as it travels along a roadway 104. For example, the vehicle 101 may enter a tunnel 112 or other structure, or shadowed area. While longer tunnels may have lighting or other illumination to assist drivers, the ambient light level may not match that outside of the tunnel 112. Also, a shorter tunnel 112 may not offer any artificial illumination, relying instead on surrounding lighting conditions outside of the tunnel 112 to illuminate the roadway 104.

Additionally, as the vehicle 101 travels the environment may change. For example, the sun may shine light on or around the vehicle 101 from a number of angles and elevations (represented as positions 106', 106'', and 106'''). When the sun is in a first position 106', as depicted in the exemplary environment of FIG. 1, the sun's rays may be directly incident on the front of the vehicle 101 and the driver's face. The occupant monitoring system's sensors may detect a brightness level in the cabin of the vehicle and adjust the image sensors accordingly to ensure accurate and consistent capturing of the driver.

When the sun is in a second position 106'', it may be behind a cloud or some other obstacle obscuring the vehicle 101 from direct sunlight. Additionally, as the sun may be at a different angle, the level of sunlight entering the cabin of the vehicle may decrease. In order to maintain a consistent image of the driver, the driver monitoring system may adjust the sensor settings to adjust for the change in cabin lighting. Further yet, when the sun is in a third position 106''', for example, there may be little or no direct sunlight incident on the driver's face, and the image sensors may be facing into the sun. Again, the in-cabin lighting conditions may change, necessitating an adjustment to the image sensors to ensure an accurate capture of the driver.

According to one aspect of the present disclosure, an occupant monitoring system may track current ambient lighting conditions and proactively determine upcoming changes to the ambient lighting. The system may adjust the on-board image sensors according to a prospective change such that the sensors are adjusts substantially concurrently with the ambient lighting change. For example, the vehicle 101 equipped with an occupant monitoring system 102 may include a predictive lighting module to estimate and predict the amount of in-cabin lighting based on environmental and other external data. Environmental data may include current ambient light levels as sensed by on-board sensors and other equipment, including cameras and other light sensing equipment. Cameras and other image sensing equipment may be configured to sense or perceive light levels at a distance from the vehicle 101 along the roadway 104 or the vehicle's projected or programmed path. Such imaging devices may be part of or include a trajectory and navigation system configured to assist in operating and moving a vehicle through the environment.

Sensors and imaging devices may include a forward-facing camera, inertial measurement unit (IMU), driver facing camera, light intensity sensor, GPS, and ambient light sensor, LiDAR, RADAR, SONOR, or the like. A sensor may sense or detect upcoming changes in ambient light by detecting large shadows or other structures that may occlude the vehicle's cabin from the light's source. For example, on-board sensors may track, over time, the shifting light levels in and around the vehicle 101. Based on the vehicle's trajectory or route, and the trending changes to the ambient light, the predictive lighting module may predict a prospective environmental change, for example, an increase or decrease in ambient light. The system may then proactively adjust the image sensors to account for the approaching change such that the sensors adjust at about the same time as the change in light level, i.e., substantially concurrently.

As another example, a LiDAR- or other camera-equipped vehicle may obtain images in front of the vehicle 101 that the on-board trajectory and navigation system may identify as a tunnel 112. The occupant monitoring system 102, in conjunction with the on-board trajectory and navigation system may determine a distance and time until the vehicle may enter the tunnel. The occupant monitoring system may use this information to predict the in-cabin light levels when the vehicle 101 enters the tunnel. The occupant monitoring system may then adjust the image sensors of the occupant-facing camera simultaneously with the change in ambient lighting. The real-time, or near-real-time adjustment of the occupant monitoring system's image sensors eliminates any gap or transition period between when the lighting condition changes and the occupant monitoring system adjusts to that change.

According to another aspect, external data may also inform the predictive lighting module of upcoming changes to ambient light levels. The occupant monitoring system may communicate with external data sources, including for example, a satellite 110, or other wireless communication sources to determine a potential location and severity of a prospective light change. The trajectory and navigation system of the vehicle 101 may be in communication with the satellite 110 and receive data relevant to determining upcoming lighting conditions. The satellite 110, or other wireless communication source may transmit weather data, map information, or other information that may assist the predictive lighting module in determining a future change in lighting condition. For example, the predictive lighting module of a vehicle 101 traveling according to a predetermined route guided by GPS or other navigation, may obtain map information that indicates the tunnel 112 or other light-obstruction, such as buildings, mountains, or other obstacles. The predictive lighting module may correlate that information with the on-board systems tracking ambient light levels to determine when the vehicle will reach the predicted lighting change and configure the settings of the occupant monitoring system accordingly and substantially concurrently with the light change. As such, any adjustment period between before, during, and after the lighting change may be eliminated and the occupant monitoring system may maintain a consistent and accurate image of the vehicle's occupants.

Figure 2A:
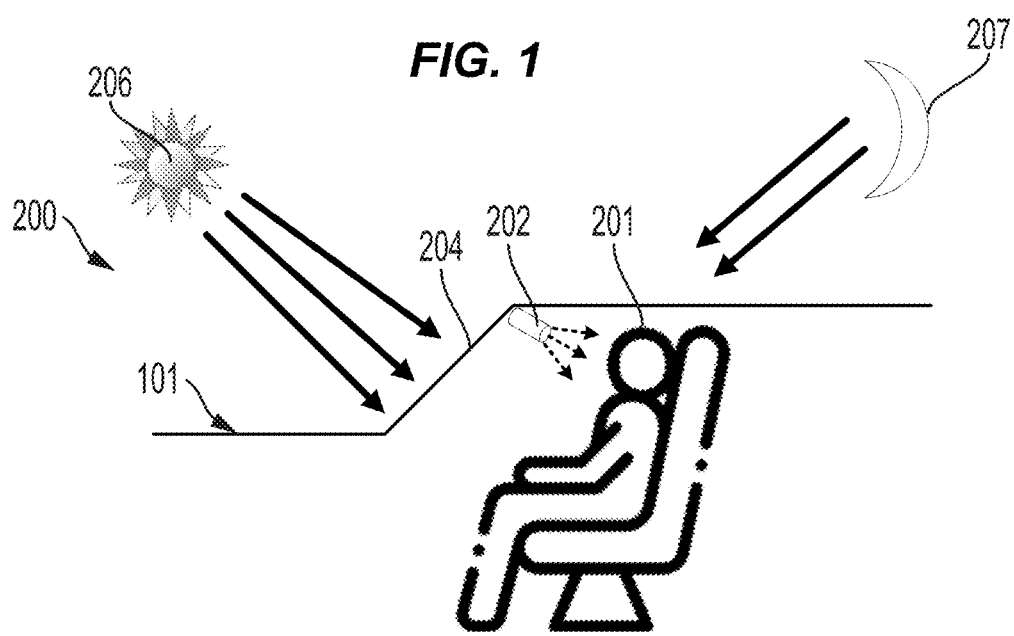
FIG. 2 is a schematic diagram of a vehicle with an occupant monitoring system according to one aspect of the present disclosure.

FIG. 2A is a schematic side-view 200 of a vehicle 101 equipped with an occupant monitoring system according to one aspect of the present disclosure. The occupant 201 of the vehicle 101, depicted here as a driver facing the front of the vehicle 101 through a windshield 204, may be monitored by a camera 202 of an occupant monitoring system. The schematic of FIG. 2A depicts varying lighting conditions incident on the vehicle 101 and cabin. For example, when the vehicle 101 is facing the sun, direct sunlight may pass through the windshield 204 and illuminate the cabin and the face of the occupant 201. The sensor settings of the camera 202 may adjust according to the in-cabin light levels created by the direct sunlight to provide an accurate image of the occupant and enable precise monitoring and tracking of the occupant's behavior. Conversely, at a different time of day, the moon 207 may be a source of ambient light and may shine little to no light on the vehicle 101 and the vehicle's cabin. The darkness inside the cabin may require the camera 202 and image sensors to adjust accordingly to account for the low light levels to ensure the camera and image sensors can sense, monitor and track the occupant.

As described herein, aspects of the present disclosure provide for an occupant monitoring system including a predictive lighting module that tracks and detect changing ambient light levels. The system further proactively adjusts image sensors so that the occupant monitoring system consistently and persistently images a vehicle occupant before, during, and after ambient light changes. For example, as depicted in FIG. 2A, as the light from the sun 206 changes due to movement across the sky, sunset, the vehicle's changing trajectory, occluding clouds or buildings, or the like, the predictive lighting module may predict the changes and adjust the settings of the camera 202 and image sensors accordingly.

Figure 2B:
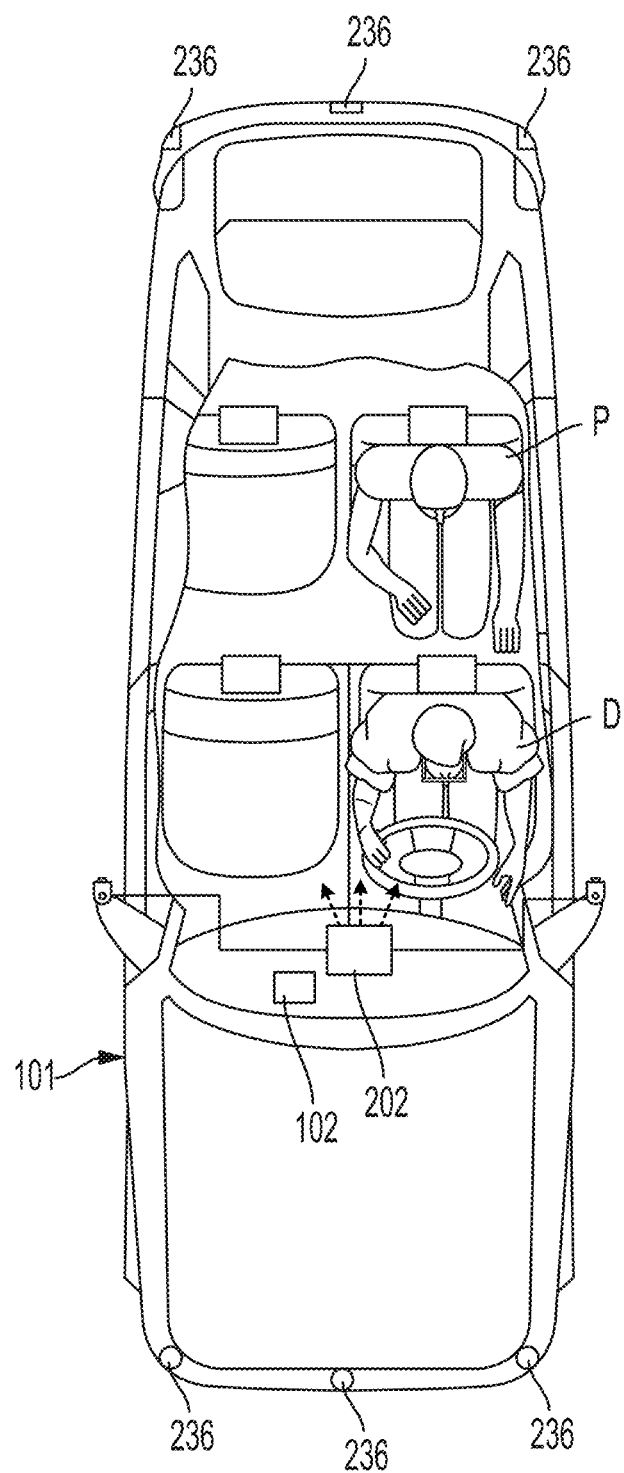

FIG. 2B depicts a top view of a vehicle 101 equipped with an occupant monitoring system 102 according to aspects described herein. The vehicle 101 may include one or more environmental sensors 236 to assist the vehicle 101 with its autonomous and semi-autonomous functions and sense changing environmental conditions. For simplicity, in FIG. 2B, the environmental sensors 236 are defined in a rear section and a front section of the vehicle 101, however the environmental sensors 236 may be located elsewhere on the vehicle. The environmental sensors 236 may be used to detect the driving environment from a 360° perspective. The environmental sensors 236 may provide information related to the operation of the vehicle 101, including the occupant monitoring system 102 and predictive lighting module. The environmental sensors 236 may include RADAR, LiDAR, SONAR, or another type of sensor. Information received by the occupant monitoring system 102 from the sensor system may be used to determine the current driving environment of the vehicle as well as a future or approaching environment.

According to one aspect of the present disclosure, the occupant monitoring system 102 may include an occupant-facing camera 202 that is configured to obtain images, or a sequence of images, of one or more occupants of the vehicle, such as a driver D, or a passenger P. The camera 202 may include infrared sensors to obtain high-resolution images of the occupants' eyes, face, hands, posture, pose, or the like. The occupant monitoring system 102 may interface with other components and systems of the vehicle 101 to enhance and assist autonomous and semi-autonomous functions.

Figure 3:
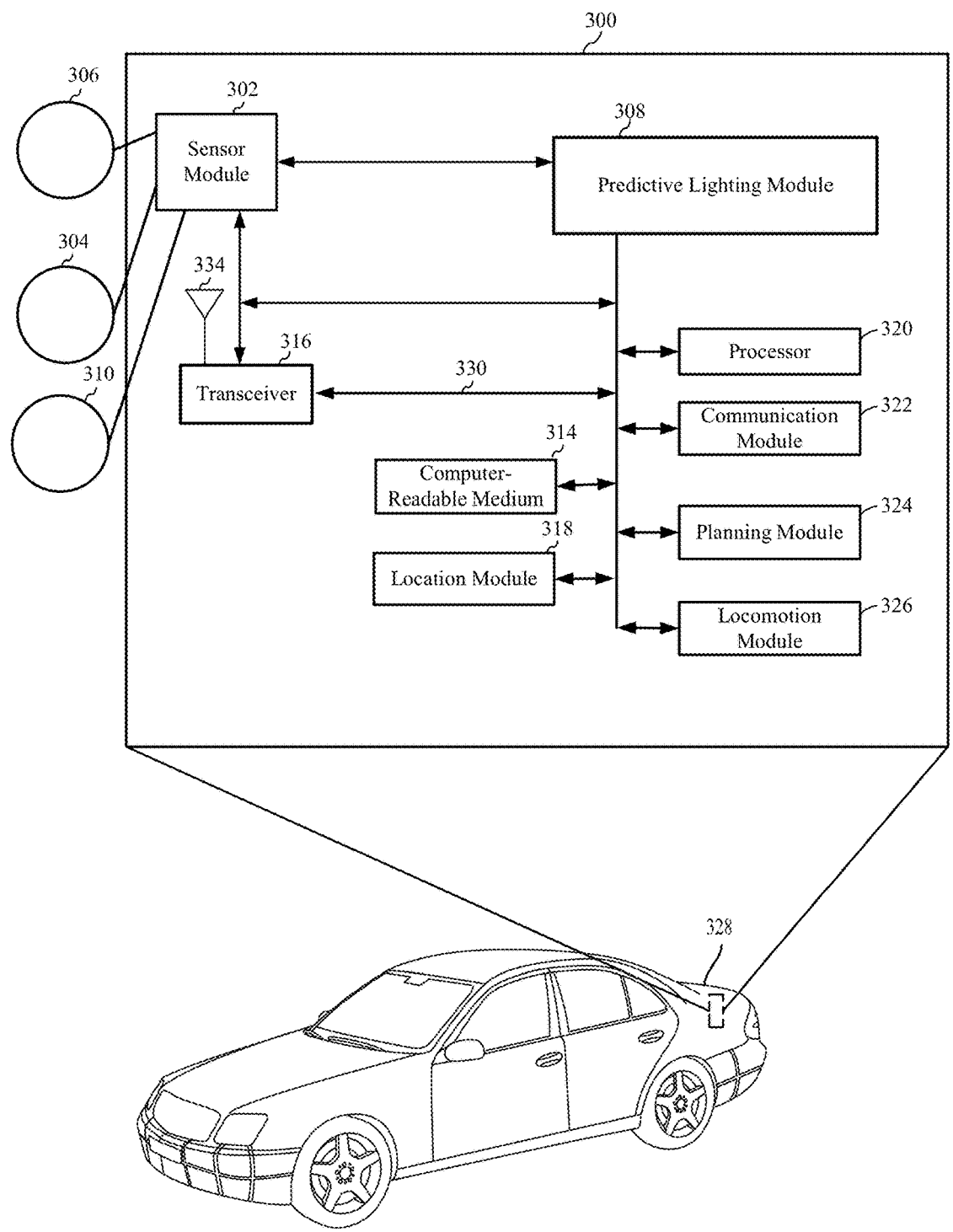
FIG. 3 is a hardware implementation of an occupant monitoring system according to one aspect of the present disclosure.

FIG. 3 is a diagram illustrating an example of a hardware implementation for an occupant monitoring system 300, according to aspects of the present disclosure. The occupant monitoring system 300 may be part of a passenger vehicle, a carrier vehicle, or other device. For example, as shown in FIG. 3, the occupant monitoring system 300 may be a component of an autonomous or semi-autonomous car 328. Aspects of the present disclosure are not limited to the occupant monitoring system 300 being a component of the car 328, as other devices, including, but not limited to, autonomous, semi-autonomous, or other vehicles may also include and use the occupant monitoring system 300.

The occupant monitoring system 300 may be implemented with a bus architecture, represented generally by a bus 330. The bus 330 may include any number of interconnecting buses and bridges depending on the specific application of the occupant monitoring system 300 and the overall design constraints. The bus 330 may link together various circuits including one or more processors and/or hardware modules, represented by a processor 320, a communication module 322, a location module 318, a sensor module 302, an actuation module 326, a planning module 324, and a computer-readable medium 314. The bus 330 may also link various other circuits such as timing sources, peripherals, voltage regulators, and power management circuits, which are well known in the art, and therefore, will not be described any further.

The occupant monitoring system 300 may include a transceiver 316 coupled to the processor 320, the sensor module 302, a predictive lighting module 308, the communication module 322, the location module 318, the actuation module 326, the planning module 324, and the computer-readable medium 314. The transceiver 316 is coupled to an antenna 334. The transceiver 316 communicates with various other devices over a transmission medium. For example, the transceiver 316 may send and receive commands via transmissions to and from a server or a remote device, such as remote device or server (not shown).

The predictive lighting module 308 may include the processor 320 coupled to the computer-readable medium 314. The processor 320 may perform processing, including the execution of software stored on the computer-readable medium 314 providing functionality according to the disclosure. The software, when executed by the processor 320, causes the occupant monitoring system 300 to perform the various functions described for a particular device, such as car 328, or any of the modules 302, 308, 314, 316, 318, 320, 322, 324, 326. The computer-readable medium 314 may also be used for storing data that is manipulated by the processor 320 when executing the software.

The sensor module 302 may be used to obtain measurements via different sensors, such as a first sensor 306, a second sensor 304, and a third sensor 310. The first sensor 306 may be a motion sensor, such as an accelerometer, gyroscope, inertial measurement unit, or the like. The second sensor may include a visual sensor, such as a stereoscopic camera, a red-green-blue (RGB) camera, LIDAR or RADAR. The third sensor 304 may be an in-cabin sensor, such as a camera, CCD, infrared sensor, or the like, configured to obtain images of an occupant of the car 328. Of course, aspects of the present disclosure are not limited to the aforementioned sensors as other types of sensors, such as, for example, thermal, sonar, and/or lasers are also contemplated for either of the sensors 304, 306, 310. The measurements of the sensors 304, 306, 310, 306 may be processed by one or more of the processor 320, the sensor module 302, the object tracking module 308, the communication module 322, the location module 318, the actuation module 326, the planning module 324, in conjunction with the computer-readable medium 314 to implement the functionality described herein. In one configuration, the data captured by the first sensor 306, the second sensor 304, and the third sensor 306 may be transmitted to an external device via the transceiver 316. The sensors 304, 306, 310 may be coupled to the car 328 or may be in communication with the car 328.

The location module 318 may be used to determine a location of the car 328. For example, the location module 318 may use a global positioning system (GPS) to determine the location of the car 328. For example, the occupant monitoring system 300 may be able to communicate with a remote monitoring service, such as mapping/navigation service, a weather service, or other environmental information provider. Information obtained through the location module may assist in determining approaching changes in environmental conditions and ambient lighting conditions. The information received through and generated by the location module 318 may inform the predictive lighting module 308 of approaching environmental conditions. If a perceived or preprogrammed route indicates the car 328 will be entering a tunnel, or urban area with tall buildings, or other environmental change, the predictive lighting module 308 may use such information to determine when and to what extent the in-cabin image sensors should be adjusted.

The communication module 322 may be used to facilitate communications via the transceiver 316. For example, the communication module 322 may be configured to provide communication capabilities via different wireless protocols, such as Bluetooth, Wi-Fi, long term evolution (LTE), 3G, 5G, or the like. The communications module may also be configured to establish a communication channel between the car 328 and an information provider. The communication module 322 may also be used to communicate with other components of the car 328 that are not modules of the predictive lighting module 308.

The occupant monitoring system 300 may also include the planning module 324 for planning a response to a detected or predicted change in environmental conditions. The planning module may interface with or be a part of the predictive lighting module 308. The planning module 324 may include a set of instructions or settings that dictate how the occupant monitoring system 300 may respond when triggered by a change. For example, depending on the signals from any of the sensors 304, 306, 310, detailing the direction, speed, and severity of a lighting change in the approaching environment, the planning module may respond with information necessary for the predictive lighting module to adjust the in-cabin sensors ensuring a consistent image capture of the occupant. The planning module 324, as well as other modules described herein, may be software modules running in the processor 320, resident/stored in the computer-readable medium 314, one or more hardware modules coupled to the processor 320, or some combination thereof.

The predictive lighting module 308 may be in communication with the sensor module 302, the transceiver 316, the processor 320, the communication module 322, the location module 318, the actuation module 326, the planning module 324, and the computer-readable medium 314. In one configuration, the predictive lighting module 308 may receive sensor data from the sensor module 302. The sensor module 302 may receive the sensor data from the sensors 304, 306, 310. According to aspects of the disclosure, the sensor module 302 may filter the data to remove noise, encode the data, decode the data, merge the data, or perform other functions. In an alternate configuration, the predictive lighting module 308 may receive sensor data directly from the sensors 304, 306, 310.

As shown in FIG. 3, the predictive lighting module 308 may include or be in communication with the planning module 324 and/or the location module. The predictive lighting module 308, based on the environmental information obtained from the sensor module 302, communication module, and others, may estimate the in-cabin lighting conditions and levels for an approaching change in environmental conditions. Given, for example, current and recent light level data, GPS data, weather data, time-of-day data, and the like, the predictive lighting module 308 may proactively determine appropriate sensor settings for the in-cabin sensors before, during, and after the environmental change to ensure a consistent and persistent image capture of the occupant. The ability to track and predict ambient light levels. proactively determine sensor settings, and adjust the in-cabin sensors in substantial real-time as the environmental changes occur may eliminate temporary image washouts or blackouts that can lead to errors or malfunctions in the occupant tracking system.

Figure 4:
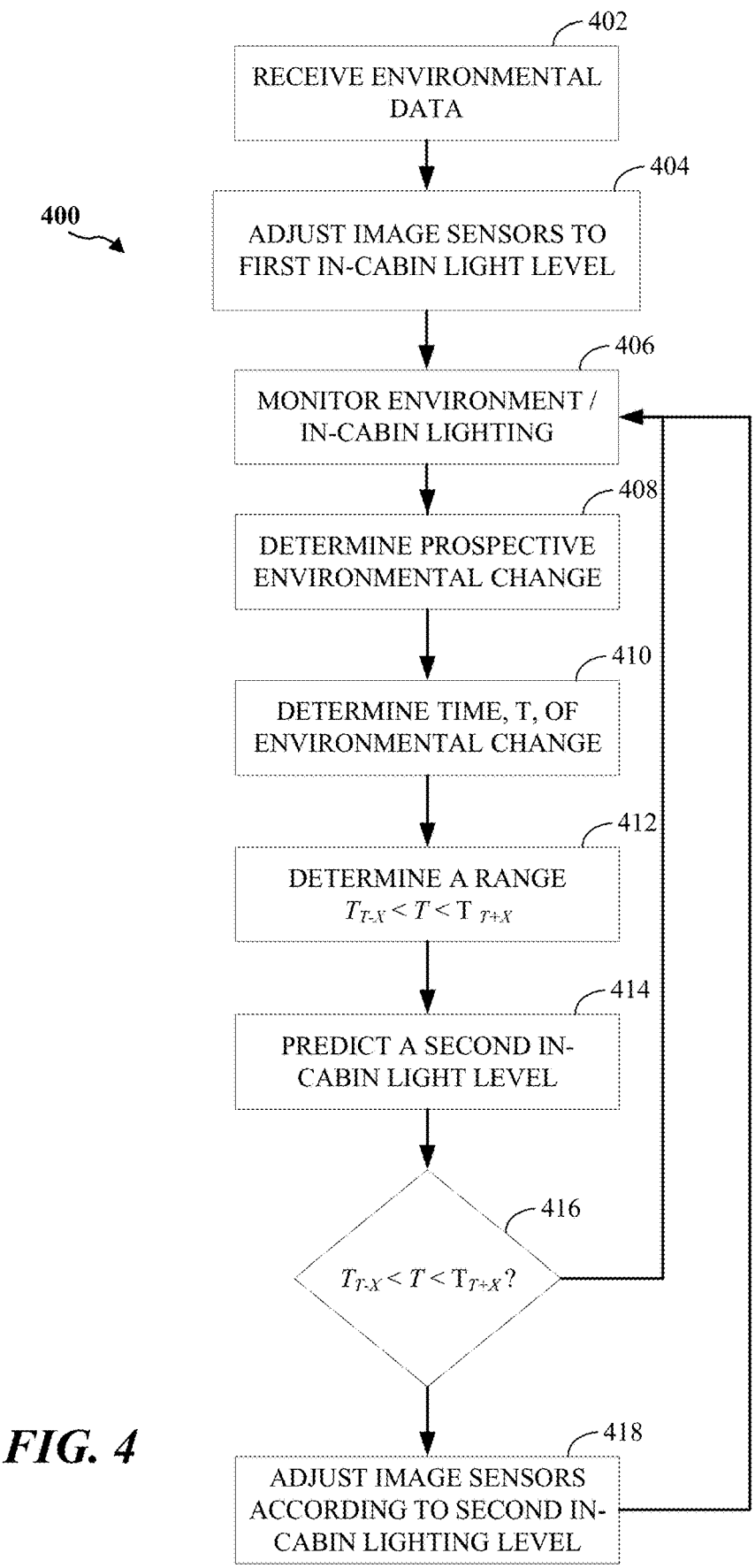
FIG. 4 is a flow diagram of a method of monitoring a vehicle occupant according to one aspect of the present disclosure.

FIG. 4 depicts a method 400 of monitoring a vehicle occupant according to an aspect of the present disclosure. As shown in block 402, an occupant monitoring system may receive environmental data, as described herein, from one or more environmental sensors, cameras, or other information sources. Environmental data may include information relating to, without limitation, traffic, route navigation, weather, ambient temperatures, ambient light conditions, buildings, structures, terrain, or the like.

The system may, as shown in block 404, adjust one or more image sensors of the occupant monitoring system according to a first in-cabin light level. As described herein, the image sensors may require adjustment based on the ambient light level in the vehicle to ensure capturing a consistent and clear image of the occupant. The first in-cabin light level may be set or adjusted according to the environmental data received from the environmental sensors.

As shown in block 406, the system may continually monitor the environment as well as in-cabin ambient lighting. The environmental sensors may continuously update local and remote environmental information that may be relevant to the system, including environmental data on a programmed navigational route. The system may also continually monitor the ambient light levels in the cabin of the vehicle. Such information may be monitored to assist in adjusting the image sensors capturing images of the vehicle occupant.

According to one aspect, as shown in block 408, the system may determine a prospective environmental change. The prospective environmental change may include changes to the local environment or the environment into which the vehicle may enter in the future. As described herein, the prospective environmental change may lead to a potential change in in-cabin lighting levels that may affect the image capturing capabilities of the system. As such, the system may use environmental data obtained from the environmental sensors to determine an upcoming change in environmental conditions that may change the ambient light level in the cabin and therefore necessitate an adjustment to the image sensors.

In addition to determining a prospective environmental change, as shown in block 410, the system may determine a time, T, when the environmental change will occur. For example, if the system determines that the vehicle may be approaching a tunnel or other light-obscuring structure on a navigational route, the system may estimate, based on current operating conditions, when the vehicle may arrive at the tunnel. Estimating the time, T, at which the environmental change may occur may allow the system to proactively determine adjustments to the image sensors needed to maintain consistent image capture of the occupant. Further, such an estimation may allow the system to make the determined adjustments at same time as, or substantially concurrently with, the change in the environment.

As shown in block 412, the system may determine a time range, $T_{T-X}<T<T_{T+X}$, where X is a predetermined time before and after the time, T. The system may define the range such that changes to the image sensors occur within a range of time around when the environmental change occurs. Given a moving vehicle, and perhaps moving environmental objects impacting the in-cabin light levels, a time range may be implemented to ensure that any adjustments made to the image sensors are executed as closely to the change in environmental conditions as possible. For example, if the system determines the vehicle may be entering an approaching tunnel in T=60 seconds, the system may define the time range to adjust the image sensors within 1 second (X=1 second). Defining a narrow time range allows the system to make adjustments to the image sensors substantially concurrently with the environmental change.

As shown in block 414, the system may predict a second in-cabin lighting level according to the prospective environmental change. The system may use the environmental data to estimate the lighting conditions in the vehicle cabin at or after the environmental change occurs. Based on the estimated lighting conditions, the system may define the second in-cabin lighting level accordingly and prepare to adjust the image sensors to account for the change in lighting.

As shown in block 416, the system may determine if the time, T, of the environmental change is nearing or occurring. According to one aspect, the system may determine whether the time, T, is within a time range triggering the adjustment of the image sensors. If the system determines that T is within the determined range, the system may make the adjustments to the image sensors according to the second in-cabin lighting level, as shown in block 418. The system determines that T is not within the determined range, indicating that the environmental change has not yet occurred, the system may continue to monitor the environment and in-cabin lighting conditions until T occurs or falls within the time range.

After the image sensors are adjusted substantially concurrently with the environmental change, the system may continue to monitor the environment and in-cabin lighting for other prospective changes.

While aspects of the present disclosure describe an occupant monitoring system focused on a driver or a car, one skilled on the art will appreciate that the system may be implemented to monitor any occupant or multiple occupants in any vehicle type. Further, while the systems disclosed herein describe an occupant monitoring system in communication with GPS, weather and on-board light sensors, one skilled in the art will appreciate that the information on which the system may predict approaching environmental changes is not limited to those specific sources and use of any source or information detailing lighting and environmental conditions is within the scope of the present disclosure.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RANI from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. An imaging system comprising:
   one or more environmental sensors;
   a camera including one or more image sensors;
   an in-cabin light sensor sensing a first in-cabin lighting level;
   a predictive lighting module in communication with the one or more environmental sensors, the in-cabin light sensor, and the camera, the predictive lighting module configured to:
   receive environmental data from the one or more environmental sensors;
   receive the first in-cabin lighting level the in-cabin light sensor;
   adjust the one or more image sensors according to the first in-cabin lighting level;

predict a prospective environmental change based on the environmental data;

predict a second in-cabin lighting level based upon the prospective environmental change;

adjust the one or more image sensors according to the second in-cabin lighting level substantially concurrently with the prospective environmental change.

2. The imaging system of claim 1 wherein the one or more image sensors include an infrared sensor.

3. The imaging system of claim 1 wherein the camera includes an occupant-facing camera disposed in a vehicle.

4. The imaging system of claim 1 wherein the one or more environmental sensors include a LiDAR sensor.

5. The imaging system of claim 1 wherein the one or more environmental sensors include a RADAR sensor.

6. The imaging system of claim 1 wherein the one or more environmental sensors include an infrared sensor.

7. The imaging system of claim 1 further comprising a communications module configured to receive the environmental data, the predictive lighting module further receiving the environmental data from the communications module.

8. The imaging system of claim 7 wherein the communications module includes a GPS receiver.

9. An occupant monitoring system of claim 1 wherein the predictive lighting module is further configured to determine a time (T), at which the prospective environmental change will occur, wherein substantially concurrently comprises a time range before and after the time (T).

10. A method of monitoring a vehicle occupant comprising:

receiving environmental data from the one or more environmental sensors;

receiving a first in-cabin lighting level from an in-cabin light sensor;

adjusting one or more image sensors according to the first in-cabin lighting level;

predicting a prospective environmental change based on the environmental data;

predicting a second in-cabin lighting level based upon the prospective environmental change; and adjusting the one or more image sensors according to the second in-cabin lighting level substantially concurrently with the prospective environmental change.

11. The method of claim 10 further comprising:

determining a time (T), at which the prospective environmental change will occur, wherein substantially concurrently comprises a time range before and after the time (T).

12. The method of claim 10 further comprising:

obtaining a first sequence of images from the one or more image sensors according to the first in-cabin lighting level; and obtaining a second sequence of images from the one or more image sensors according to the second in-cabin lighting level.

13. The method of claim 10 wherein the one or more image sensors include an infrared sensor.

14. The method of claim 10 wherein the camera includes an occupant-facing camera disposed in a vehicle.

15. The method of claim 10 wherein the one or more environmental sensors include a LiDAR sensor.

16. The method of claim 10 wherein the one or more environmental sensors include a RADAR sensor.

17. The method of claim 10 wherein the one or more environmental sensors include an infrared sensor.

18. The method of claim 10 wherein the environmental data includes GPS data.

19. An occupant monitoring system for a vehicle comprising:

an occupant facing camera, the occupant facing camera comprising one or more image sensors;

an in-cabin light sensor sensing a first in-cabin lighting level;

a communications module configured to receive navigational data;

one or more environmental sensors configured to receive environmental data;

a predictive lighting module in communication with the one or more environmental sensors, the in-cabin light sensor, and the occupant-facing camera, the predictive lighting module configured to:

receive environmental data from the one or more environmental sensors and navigation information from the communications module;

receive the first in-cabin lighting level from the in-cabin light sensor;

adjust the one or more image sensors according to the first in-cabin lighting level;

predict a prospective environmental change based on the environmental data and the navigational data;

predict a second in-cabin lighting level based upon the prospective environmental change; and adjust the one or more image sensors according to the second in-cabin lighting level substantially concurrently with the prospective environmental change.

20. The occupant monitoring system of claim 19 wherein the predictive lighting module is further configured to determine a time (T), at which the prospective environmental change will occur, wherein substantially concurrently comprises a time range before and after the time (T).

* * * * *